US012626208B2

(12) United States Patent
Iyer et al.

(10) Patent No.: US 12,626,208 B2
(45) Date of Patent: May 12, 2026

(54) ANALYSIS OF POTENTIAL FOR REDUCTION OF ENTERPRISE CARBON FOOTPRINT PROFILE

(71) Applicant: Dell Products L.P., Round Rock, TX (US)

(72) Inventors: Pushkala Iyer, Round Rock, TX (US); Lori Lynn Matthews, Austin, TX (US); Rekha Poosala, Bengaluru (IN)

(73) Assignee: DELL PRODUCTS L.P., Round Rock, TX (US)

( * ) Notice: Subject to any disclaimer, the term of this patent is extended or adjusted under 35 U.S.C. 154(b) by 580 days.

(21) Appl. No.: 18/048,467

(22) Filed: Oct. 21, 2022

(65) Prior Publication Data

US 2024/0135292 A1    Apr. 25, 2024
US 2024/0232768 A9    Jul. 11, 2024

(51) Int. Cl.
*G06Q 10/0637* (2023.01)
*G06Q 30/018* (2023.01)

(52) U.S. Cl.
CPC ..... *G06Q 10/06375* (2013.01); *G06Q 30/018* (2013.01)

(58) Field of Classification Search
CPC .. G06Q 10/06375; G06Q 30/018; G06F 9/50; G06F 1/26; Y02P 90/84
USPC .................. 705/7.37, 317; 700/295; 709/244
See application file for complete search history.

(56) References Cited

U.S. PATENT DOCUMENTS

| | | | | |
|---|---|---|---|---|
| 7,917,400 | B1 * | 3/2011 | Brandwine | ........ G06Q 30/0633 705/26.61 |
| 2009/0177505 | A1 * | 7/2009 | Dietrich | ................. G06Q 10/08 705/7.37 |
| 2011/0106945 | A1 * | 5/2011 | Conway | ................... H04L 45/00 709/224 |
| 2011/0178938 | A1 * | 7/2011 | Reich-Weiser | ........ G06Q 10/00 705/317 |
| 2013/0212410 | A1 * | 8/2013 | Li | ........................... G06F 1/263 713/300 |
| 2016/0109916 | A1 * | 4/2016 | Li | ............................ H02J 7/35 700/295 |
| 2021/0342185 | A1 * | 11/2021 | Naidu | ................... G06F 1/3206 |
| 2022/0108328 | A1 * | 4/2022 | Verma | ...................... G06N 3/04 |
| 2022/0398515 | A1 * | 12/2022 | McGuire | ............. G06F 11/3428 |

(Continued)

*Primary Examiner* — Rutao Wu
*Assistant Examiner* — Stephen S Swartz
(74) *Attorney, Agent, or Firm* — Amin, Turocy & Watson, LLP

(57) ABSTRACT

The described technology is generally directed towards reducing the carbon footprint arising from a client's operational workloads performed at a data center. Various embodiments are presented to enable assessment of the client's requirements regarding the workloads performed on digital data stored at one or more data centers. Based thereon, a determination can be made regarding improving the hosting and operation of the workloads to reduce the carbon footprint. The carbon footprint can be reduced based on energy supply to the data center (e.g., fossil fuel versus green energy sources), utilizing newer generation data servers versus older, lower capacity, inefficient data servers, pooling workloads onto a single moderate to high efficiency server, and the like. The determination to reduce the carbon footprint can be performed locally within a data center or globally across a community of data centers.

20 Claims, 8 Drawing Sheets

(56) References Cited

U.S. PATENT DOCUMENTS

| 2023/0017632 A1* | 1/2023 | Herb | G06F 9/505 |
| 2024/0296507 A1* | 9/2024 | Lei | G06Q 10/0639 |

* cited by examiner

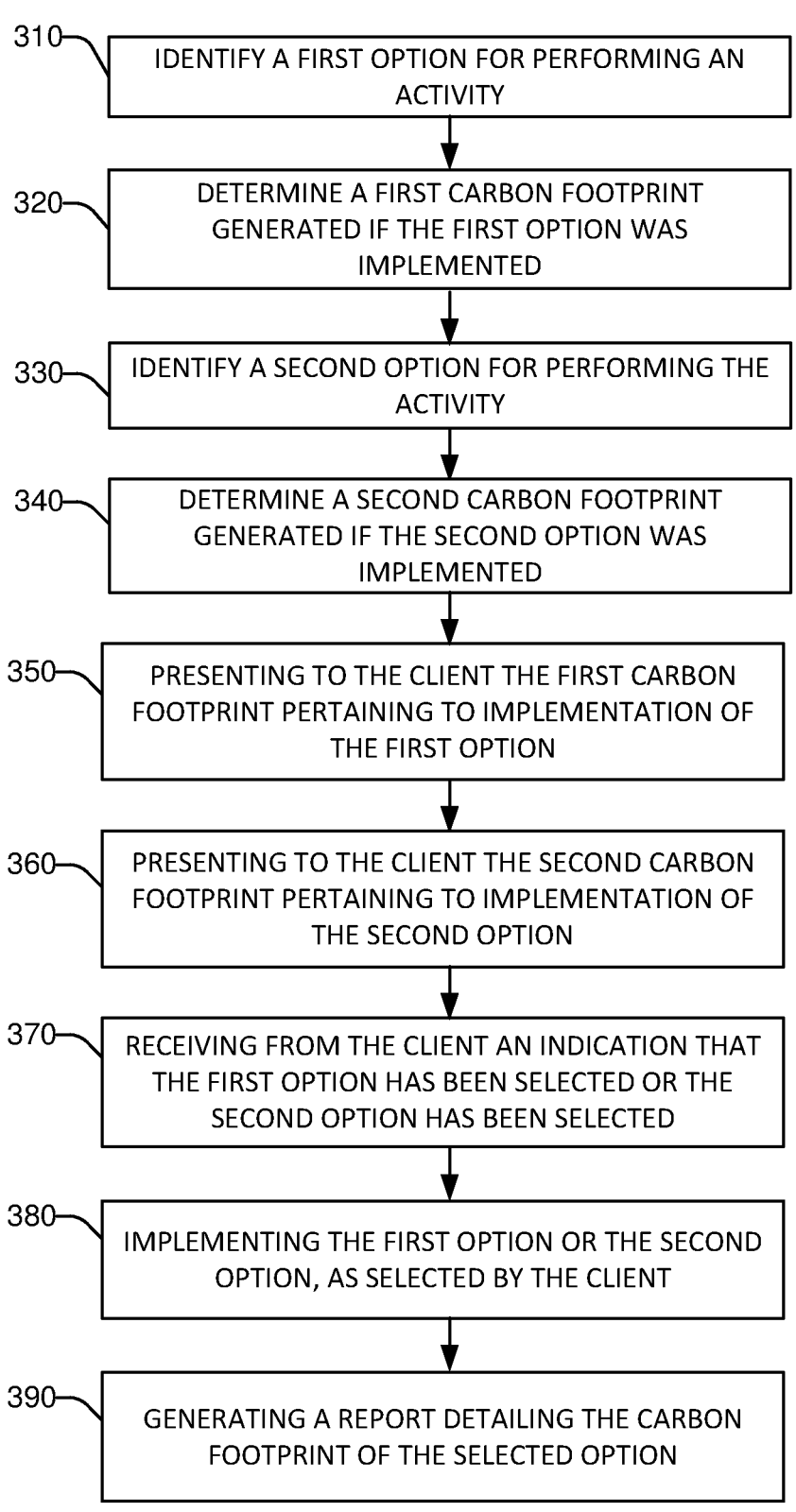

310 — IDENTIFY A FIRST OPTION FOR PERFORMING AN ACTIVITY

320 — DETERMINE A FIRST CARBON FOOTPRINT GENERATED IF THE FIRST OPTION WAS IMPLEMENTED

330 — IDENTIFY A SECOND OPTION FOR PERFORMING THE ACTIVITY

340 — DETERMINE A SECOND CARBON FOOTPRINT GENERATED IF THE SECOND OPTION WAS IMPLEMENTED

350 — PRESENTING TO THE CLIENT THE FIRST CARBON FOOTPRINT PERTAINING TO IMPLEMENTATION OF THE FIRST OPTION

360 — PRESENTING TO THE CLIENT THE SECOND CARBON FOOTPRINT PERTAINING TO IMPLEMENTATION OF THE SECOND OPTION

370 — RECEIVING FROM THE CLIENT AN INDICATION THAT THE FIRST OPTION HAS BEEN SELECTED OR THE SECOND OPTION HAS BEEN SELECTED

380 — IMPLEMENTING THE FIRST OPTION OR THE SECOND OPTION, AS SELECTED BY THE CLIENT

390 — GENERATING A REPORT DETAILING THE CARBON FOOTPRINT OF THE SELECTED OPTION

FIG. 3

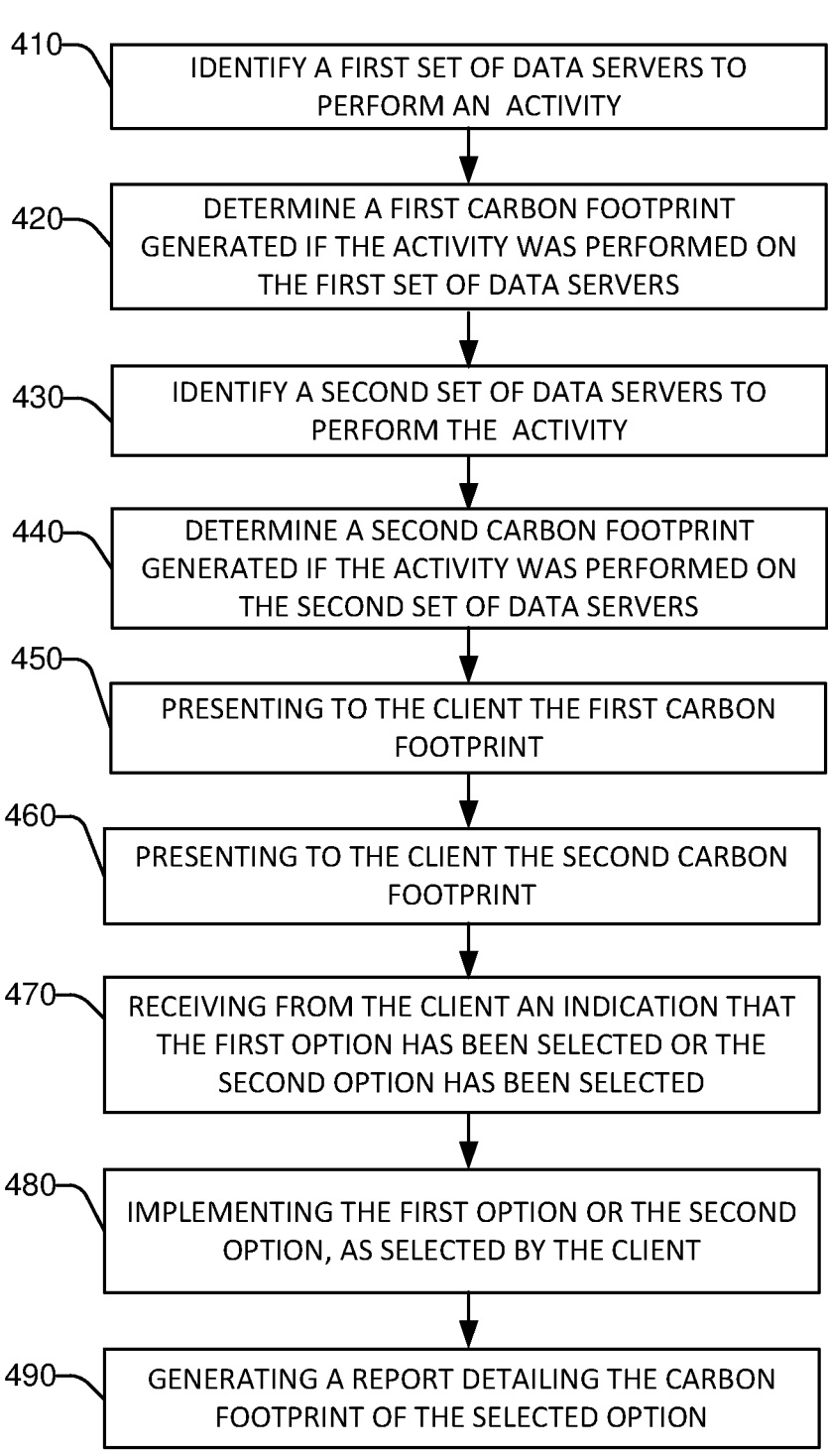

410 — IDENTIFY A FIRST SET OF DATA SERVERS TO PERFORM AN ACTIVITY

420 — DETERMINE A FIRST CARBON FOOTPRINT GENERATED IF THE ACTIVITY WAS PERFORMED ON THE FIRST SET OF DATA SERVERS

430 — IDENTIFY A SECOND SET OF DATA SERVERS TO PERFORM THE ACTIVITY

440 — DETERMINE A SECOND CARBON FOOTPRINT GENERATED IF THE ACTIVITY WAS PERFORMED ON THE SECOND SET OF DATA SERVERS

450 — PRESENTING TO THE CLIENT THE FIRST CARBON FOOTPRINT

460 — PRESENTING TO THE CLIENT THE SECOND CARBON FOOTPRINT

470 — RECEIVING FROM THE CLIENT AN INDICATION THAT THE FIRST OPTION HAS BEEN SELECTED OR THE SECOND OPTION HAS BEEN SELECTED

480 — IMPLEMENTING THE FIRST OPTION OR THE SECOND OPTION, AS SELECTED BY THE CLIENT

490 — GENERATING A REPORT DETAILING THE CARBON FOOTPRINT OF THE SELECTED OPTION

FIG. 4

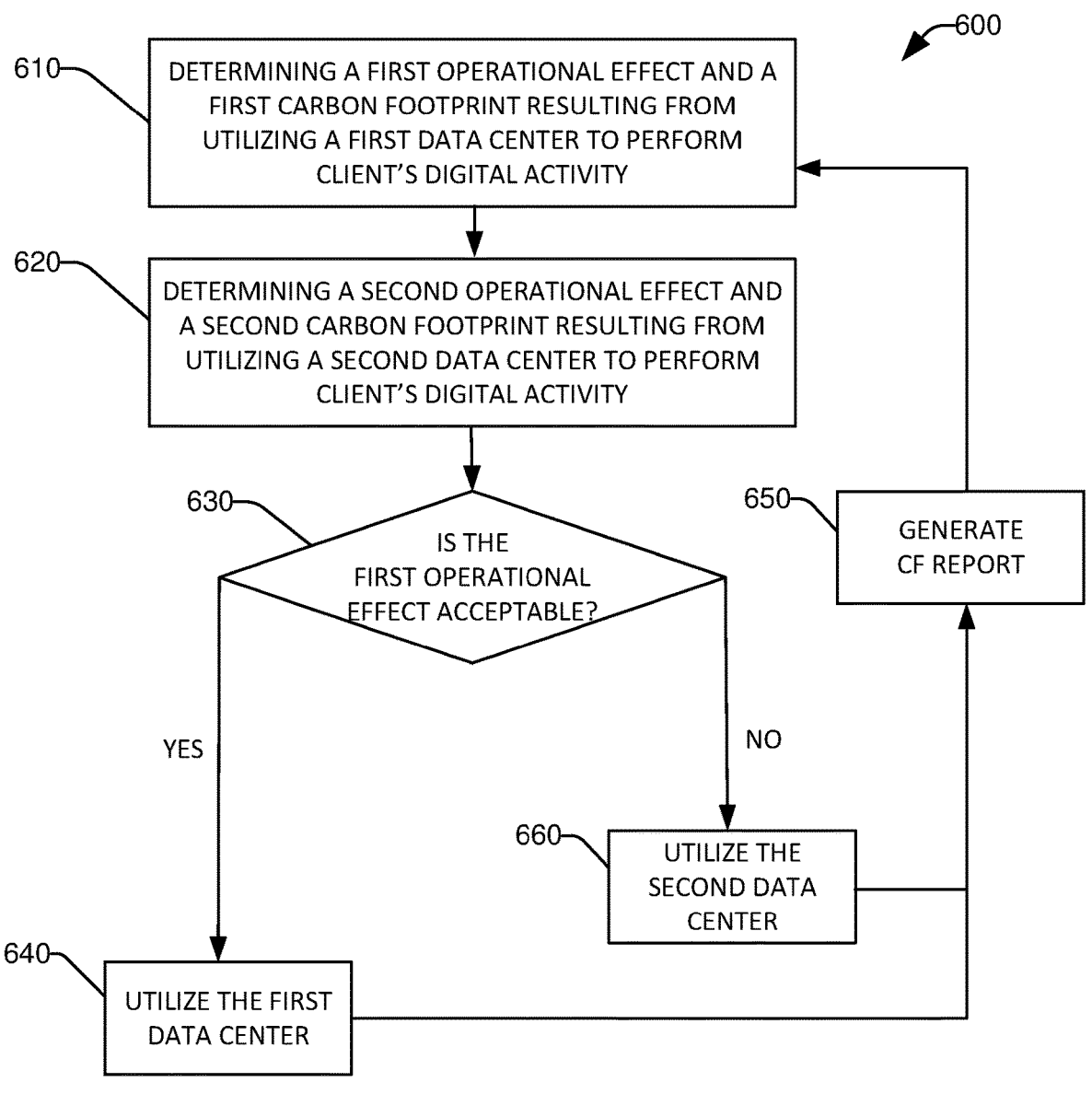

610 — DETERMINING A FIRST OPERATIONAL EFFECT AND A FIRST CARBON FOOTPRINT RESULTING FROM UTILIZING A FIRST DATA CENTER TO PERFORM CLIENT'S DIGITAL ACTIVITY

620 — DETERMINING A SECOND OPERATIONAL EFFECT AND A SECOND CARBON FOOTPRINT RESULTING FROM UTILIZING A SECOND DATA CENTER TO PERFORM CLIENT'S DIGITAL ACTIVITY

630 — IS THE FIRST OPERATIONAL EFFECT ACCEPTABLE?

YES

NO

650 — GENERATE CF REPORT

660 — UTILIZE THE SECOND DATA CENTER

640 — UTILIZE THE FIRST DATA CENTER

ANALYSIS OF POTENTIAL FOR REDUCTION OF ENTERPRISE CARBON FOOTPRINT PROFILE

BACKGROUND

"Carbon footprint" is a term commonly used to express a total amount of greenhouse gases (including carbon dioxide ($CO_2$), methane ($CH_4$), nitrous oxide ($N_2O$), chlorofluorocarbons (CFCs), perfluorocarbons (PFCs), etc.) generated by human activity. Further, the amount of $CO_2$ and other greenhouse gases being emitted by an organization or an activity is an important aspect of the "ecological footprint" of an operation and/or an activity. The impact of $CO_2$ generated during operation of data centers is being factored into the design, location, and operation of the data centers, particularly in view of local, national, international regulations and recommendations, in conjunction with societal pressures. The greater the reduction in the carbon footprint resulting from an organization's operations, the more likely the organization will be perceived by the public, governmental entities, etc., as to be making significant steps towards operational sustainability and playing their part in the reduction of global warming.

The standardized unit for measure for climate change-centric sustainability goals and targets is metric tons of $CO_2$ (MT $CO_2$). The measure is not limited only to $CO_2$, but $CO_2$ equivalents ($CO_2$e or $CO_2$-eq) can be utilized to determine impact of other greenhouse gases such as $CH_4$, $N_2O$, CFCs, PFCs, etc. For example, one metric ton of $CH_4$ has a warming effect equivalent to ~25 times that of $CO_2$, hence, the global warming potential of 1MT $CH_4$ has a 25MT $CO_2$ e (a ratio of 25:1). Similarly, 1MT $N_2O$ equates to 298MT $CO_2$ e. Such an approach enables the carbon footprint of a variety of different greenhouse gases to be expressed as a single number.

The above-described background is merely intended to provide a contextual overview of some current issues and is not intended to be exhaustive. Other contextual information may become further apparent upon review of the following detailed description.

SUMMARY

The following presents a simplified summary of the disclosed subject matter to provide a basic understanding of one or more of the various embodiments described herein. This summary is not an extensive overview of the various embodiments. It is intended neither to identify key or critical elements of the various embodiments nor to delineate the scope of the various embodiments. The sole purpose of the Summary is to present some concepts of the disclosure in a streamlined form as a prelude to the more detailed description that is presented later.

In one or more embodiments described herein, systems, devices, computer-implemented methods, methods, apparatus and/or computer program products are presented to facilitate a reduction in the carbon footprint resulting from one or more data center operations pertaining to at least one of storing client data on at least one data server or executing a workload on the client data.

According to one or more embodiments, a system can be utilized, wherein the system comprises at least one processor, and a memory coupled to the at least one processor and having instructions stored thereon, wherein, when executed by the at least one processor, the instructions facilitate performance of operations, comprising, based on first environmental impact data representative of a first environmental impact associated with a first option available to perform a computing operation with respect to client data at a second computing system and second environmental impact data representative of a second environmental impact associated with a second option available to perform a computing operation with respect to the client data. In an embodiment, the operations can further comprise outputting the first environmental impact data and the second environmental impact data via a user interface of the second computing system. In another embodiment, the operations can further comprise, to reduce a carbon footprint associated with the computing operation with respect to the data, based on input data received via the user interface comprising an indication of a first selection of the first option, causing the first option to be implemented to perform the computing operation with respect to data, or based on the input data comprising the indication of a second selection of the second option, causing the second option to be implemented to perform the computing operation with respect to data. In a further embodiment, the operations can further comprise comparing the first environmental impact data with the second environmental impact data, and based on a result of the comparing indicating that the first option has a lower carbon footprint than the second option, recommending implementation of the first option. In another embodiment, the first option is a first data center operating at a first location and the second option is a second data center operating at a second location. In a further embodiment, the first option is a first data center operating with a first energy efficiency, wherein the second option is a second data center operating with a second energy efficiency, and wherein the first energy efficiency is greater than the second energy efficiency.

According to one or more embodiments, a computer-implemented method is provided, wherein the method comprises determining, by a device comprising a processor, first environmental impact data of a first option available to process a client data workload and second environmental impact data of a second option available to process the client data workload, wherein the client data has a digital format. In an embodiment, the method can further comprise presenting the first environmental impact data and the second environmental impact data. In a further embodiment, the method can further comprise implementing based on selection of the first option, the first option to process the client data workload, or based on selection of the second option, the second option to process the client data workload. In another embodiment, the method can further comprise generating a report detailing a reduction in carbon footprint generated by utilizing the first option instead of the second option. In a further embodiment, the first option can be a first energy and the second option can be a second energy, wherein the first energy is generated primarily with green energy sources and the second energy is generated primarily with fossil-fuel energy sources. In another embodiment, the first option can be first data server and the second option can be a second data server, wherein the first data server utilizes less energy to process a client data workload than an energy utilized by the second data server to process the client data workload.

Further embodiments can include a computer program product stored on a non-transitory computer-readable medium and comprising machine-executable instructions, wherein when executed, the machine-executable instructions cause a machine to perform operations, comprising determining first environmental impact data of a first option available to process a client data workload, wherein the client data is digital data. In another embodiment, the operations can further comprise determining second environmental impact data of a second option available to process the client data workload. In a further embodiment, the operations can further comprise presenting the first environmental impact data and the second environmental impact data. In another embodiment, the operations can further comprise implementing, based on selection of the first option, the first option to process the client data workload, or based on selection of the second option, the second option to process the client data workload. In another embodiment, the first environmental impact data can be a first carbon footprint generated by first equipment available to process the client data workload, and the second environmental impact data can be a second carbon footprint generated by second equipment available to process the client data workload. In another embodiment, the first environmental impact data can be a first carbon footprint generated by first equipment available to process the client data workload, and the second environmental impact data can be a second carbon footprint generated by second equipment available to process the client data workload. In another embodiment, the first environmental impact data can be a first carbon footprint created by a first energy provider available to power processing of the client data workload, and the second environmental impact data can be a second carbon footprint created by a second energy provider available to power processing of the client data workload. In a further embodiment, generation of power by the first energy provider utilizes a greater number of green energy sources than the second energy source utilizes to generate power.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 3 is a flow diagram of a non-limiting computer implemented method for minimizing a carbon footprint of various workloads and operations performed at one or more data centers, in accordance with one or more embodiments described herein.

FIG. 4 is a flow diagram of a non-limiting computer implemented method for minimizing a carbon footprint of various workloads and operations performed at one or more data servers, in accordance with one or more embodiments described herein.

FIG. 6 is a flow diagram of a non-limiting computer implemented method for minimizing a carbon footprint of various workloads and operations performed at one or more data servers, in accordance with one or more embodiments described herein.

DETAILED DESCRIPTION

Figure 1:
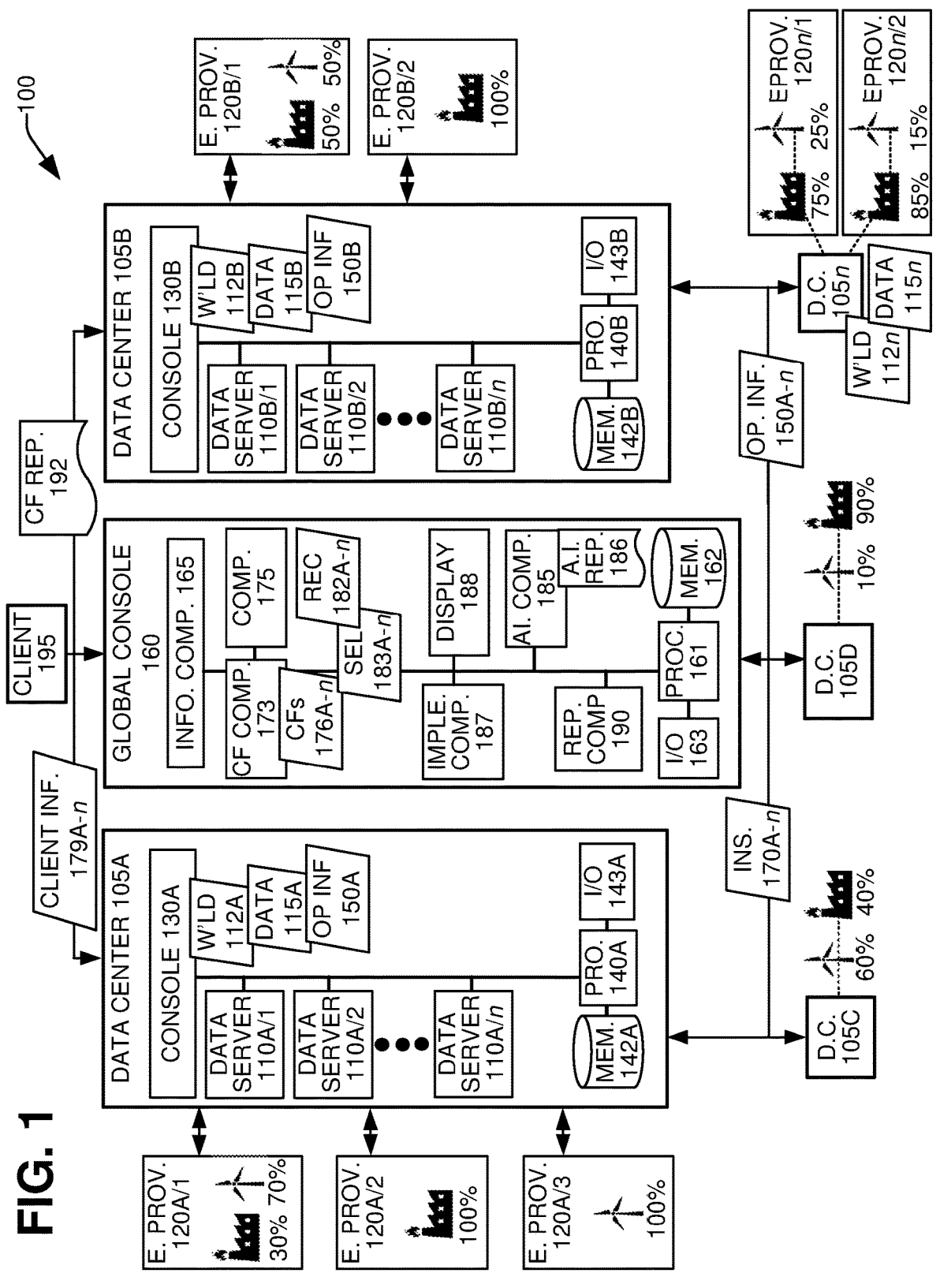
FIG. 1 is a diagram illustrating components utilized to minimize a carbon footprint of various workloads and operations performed at one or more data centers and/or data servers, in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is to be appreciated, however, that the various embodiments can be practiced without these specific details, e.g., without applying to any particular networked environment or standard. In other instances, well-known structures and devices are shown in block diagram form in order to facilitate describing the embodiments in additional detail.

The subject application generally relates to reducing a carbon footprint of a data center configured to host client data and applications. In this regard, the various embodiments presented herein are directed towards reducing the carbon footprint of various operations, and the like, being performed at a data center and/or a community of data centers. Data storage and processing operations comprise the largest portion of energy consumption (and accordingly, the largest carbon footprint) of a data center, e.g., compared with energy consumed in operating the data center. Currently, management of data center operations (e.g., by utilizing systems management consoles) do not:

a) provide a carbon footprint of their data center operations in a global manner, or b) provide potential for a data center, or a client of data center, to further reduce their respective carbon footprint.

The various embodiments presented herein can be implemented at a data center, e.g., at a local systems management console, to facilitate improving the operational and energy efficiency of one or more digital operations (also known as workloads) occurring at the data center to reduce the client's operational carbon footprint(s). Further, the various embodiments can be implemented at a global systems management console, to review the community of local data centers to determine and utilize one or more local data centers to reduce the carbon footprint of a client's digital operations.

The term workload(s) is used herein to convey the various activities associated with hosting data (e.g., in a digital format, code, information) at one or more data centers and the various operations, processes, workflows, computations, analytics, algorithm execution, maintaining, updating, and the like, performed on the data as a function of a client's activity regarding the data. Specific workload activities can range from storing and maintaining data on a data server, through to executing algorithms to analyze and/or modify the data (e.g., as a function of operations performed at a data center and/or remotely), transmission of data, receiving one or more instructions regarding processing of the data, updating data, replicating data, and the like.

It is to be appreciated that the various embodiments presented herein can be implemented automatically by one or more components configured to perform the one or more operations, functions, etc. Automated operations can include, for example, reviewing data server functionality, reviewing energy providers, generation of operational information, determination of carbon footprint(s), selection and implementation of data servers to achieve a reduction in carbon footprint(s), reporting of the resulting carbon footprint(s), and the like.

As used herein, n is any positive integer. Regarding identification of components presented herein, identifier XXXA-n is used to identify similar components that are distributed across the respective systems, e.g., various data centers 105A-n occur across the system. Further, an identifier XXXA/1 to XXXn/n is used to identify similar components that are associated with a particular data center, e.g., data center 105A has a plurality of data servers 110A/1 to 110A/n, data center 105B has a plurality of data servers 110B/1 to 110B/n.

Turning to the figures, FIG. 1 presents a system 100 comprising various data centers and consoles located locally and globally to reduce a carbon footprint(s) relating to computing data and processes, in accordance with one or more embodiments described herein.

In an embodiment, a collection of data centers 105A-n can be communicatively coupled to a global console 160. A client 195 of the operator of the global console 160 and/or data centers 105A-n can be in communication with the global console 160 and/or the data centers 105A-n. Communication between any of the global console 160, the client 195, and any of the data centers 105A-n can be via any suitable communication technology, e.g., fiber optic cable, satellite, cellular, and the like. The various data centers 105A-n can be located across any region of the globe, e.g., across a municipality, a county, a state, a country, a geographic region, a continent, multiple countries, multiple continents, and suchlike. In a further embodiment, the global console 160 (also known as a global systems management console, and the like) can be located in the "cloud", e.g., a cloud-based analytics system, a cloud computing-based resource, and the like. The global console 160 can be configured to obtain operational data from the community of data centers 105A-n and determine data activities performed at one or more of the community of local consoles to reduce the client's operational carbon footprint (as further described).

Each data center 105A-n can include one or more data servers 110A-n, for example, a first data center 105A includes data servers 110A/1, 110A/2, through to 110A/n, while a second data center 105B includes data servers 110B/1, 110B/2, through to 110B/n, and an nth data center 105n includes data servers 110n/1, 110n/2, through to 110n/n. The data servers 110A-n can be utilized to host data 115A-n (e.g., digital data, code, information, and the like) and/or perform one or more workloads 112A-n regarding data 115A-n located at the respective data centers 105A-n. The workloads 112A-n can include, in a non-limiting list, storage of the data 115A-n on a data server (e.g., any of data servers 110A-n), execution of one or more hosted applications, algorithms, functions, operations, etc., to process and/or transform data 115A-n, transmission of data 115A-n to one or more devices externally and/or remotely located to the respective data center 105A-n, receiving data 115A-n from one or more devices externally and/or remotely located to the respective data center 105A-n, processing of data 115A-n received at a data center 105A-n, and the like. It is to be appreciated that each workload(s) 112A-n at a respective data center can comprise of numerous workload operations and functions, e.g., workload(s) 112A can include a variety of workloads being performed at data center 105A, workload(s) 112B can include a variety of workloads being performed at data center 105B, and similarly, workload(s) 112n can include a variety of workloads being performed at data center 105n.

As further shown in FIG. 1, one or more energy providers 120A-120n can be associated with each data center 105A-n, wherein each of the data centers 105A-n can be configured to receive power (e.g., electrical power) from the one or more energy providers 120A-120n, wherein the power can be utilized to power the data servers 110A-n (and associated IT equipment, inventory, etc.). In an embodiment, a first energy provider (e.g., energy provider 120A/1) providing power to a particular data center (e.g., data center 105A) can source power from different sources than a second energy provider (e.g., energy provider 120A/2) also providing energy to the data center (e.g., data center 105A). As shown in the example scenario depicted in FIG. 1, the energy provider 120A/1 sources 30% of its energy production from fossil fuel sources (e.g., coal, gas, fracking, and the like) and 70% of its energy production from green energy sources (e.g., solar, wind, geothermal, hydro, and the like), while the energy provider 120A/2 sources 100% of its energy production from fossil fuel sources, and the energy provider 120A/n sources 80% of its energy production from fossil fuel sources and 20% of its energy production from green energy sources. As further described, the respective energy provider can be selected to provision energy to the data center (e.g., data center 105A), wherein the selection (e.g., fossil fuel-based energy, green energy, or combination of both) can affect the carbon footprint determined for performing the workloads 112A-n for the client 195 at a respective data center 105A-n. Although the price of green energy is continually reducing, green energy is still largely more costly than fossil fuel-sourced energy. Accordingly, a client may have to pay more to reduce their carbon footprint by using green energy-sourced power than if they utilized fossil fuel-sourced energy, however, the decision to utilize more costly fuel sources can be stimulated in view of a reduced carbon footprint can show compliance with various government-encouraged operating procedures and also garner public approval.

In an embodiment, each data center 105A-n can further respectively include a local console 130A-n (also known as a local systems management console, an on-premises console, an on-prem console, and the like). The local console 130A-n can be configured to monitor, analyze, and/or control, in a non-limiting list, operation of the data servers 110A-n located at each data center 105A-n; the workloads 112A-n being performed at the respective data center 105A-n; process and act upon instructions received from the client 195 and/or the global console 160; and the like. In an embodiment, the local consoles 130A-n can generate operational information 150A-n regarding various operations, functions, processes, etc., being performed at the respective data center 105A-n. The operational information 150A-n can include information, data, code, etc., regarding the respective workloads 112A-n being performed at the data center, data 115A-n at the data center, operational state and usage history of a data server (e.g., any of data servers 110A-n) at the data center, information regarding energy provider(s) (e.g., any of energy providers 120A-n) providing power to the respective data center, location of the data center, and the like.

As shown in FIG. 1, each data center 105A-n can include a processor 140A-n and a memory 142A-n, wherein the processor 140A-n can execute the various components, functions, operations, etc., and the memory 142A-n can be utilized to store the various computer-executable components, etc., as well as data 115A-n, workloads 112A-n, and any function code/operational code utilized by workloads 112A-n employed to process, store, transmit, receive, etc., the data 115A-n, along with operation of the local console 130A-n, operational information 150A-n, instructions received from the client 195 and/or the global console 160, and the like. As further shown, each data center 105A-n can include an input/output (I/O) component 143A-n configured to enable transmission of data 115A-n, workloads 112A-n, information, instructions, and the like, to and/or from the respective data center 105A-n to one or more external systems, devices, etc., such as the client 195, global console 160, another data center 105A-n, a remote system (not shown), and the like.

As mentioned, in an embodiment, the data centers 105A-n can be communicatively coupled to the global console 160, wherein the global console 160 can be configured to monitor execution of the workloads 112A-n. The global console 160 can be further configured to monitor operation of the respective data servers 110A-n (e.g., with regard to operational capacity, operational efficiency, workloads 112A-n performed thereon, operations performed on data 115A-n, selection and utilization of energy providers 120A-n, and the like). As further mentioned, in an embodiment, monitoring of the workloads 112A-n, data servers 110A-n, etc., by the global console 160 can be conducted with regard to reducing the carbon footprint relating to the workloads 112A-n being performed.

As shown in FIG. 1, the global console 160 can include a processor 161 and a memory 162, wherein the processor 161 can execute the various computer-executable components, functions, operations, etc., and the memory 162 can be utilized to store the various computer-executable components, functions, code, etc., instructions (e.g., instructions 170A-n, as further described), operational information 150A-n, data 115A-n, workloads 112A-n and any associated function code/operational code, specification and usage information regarding data servers 110A-n, operational information regarding a local console 130A-n and/or a data center 105A-n, and the like. As further shown, the global console 160 can include an I/O component 163 configured to enable transmission of information (e.g., instructions 170A-n, workloads 112A-n, data 115A-n, operational information 150A-n, and the like) between the global console 160 and a respective local console 130A-n/data center 105A-n, the client 195, and an external system, device, etc.

In an embodiment, the global console 160 can include an information component 165, wherein the information component 165 can be utilized to transmit one or more instructions 170A-n to the one or more data centers (e.g., to respective local consoles 130A-n at any of data centers 105A-n). The one or more instructions 170A-n can be utilized to, in a non-limiting list, request operational information 150A-n from any data center 105A-n. In response to receiving (e.g., via I/O component 143A-n) the one or more instructions 170A-n, one or more components (e.g., local consoles 130A-n) at the one or more data centers 105A-n can compile the requested operational information 150A-n (e.g., workloads 112A-n, data 115A-n, and the like) and transmit (e.g., via I/O component 143A-n) the operational information 150A-n to the global console 160 for further processing and analysis by one or more components at the global console 160. In an embodiment, the operational information 150A-n received from the data centers 105A-n can be stored in memory 162.

The information component 165 can be further utilized to transmit one or more instructions 170A-n to the one or more data centers (e.g., any of data centers 105A-n) regarding one or more operations currently performed, or to be performed, at the respective data center. For example, in an embodiment, an instruction 170A-n can be to instruct a data center (e.g., data center 105A) to select a first energy provider having the lowest carbon footprint (e.g., energy provider 120A/1 sourcing 30% fossil fuel and 70% green energy) to provide energy to the data center to power the data servers hosting the client's workloads 112A-n in preference over a second energy provider (e.g., energy provider 120A/2 sourcing 100% fossil fuel), wherein utilizing energy provided by the second energy provider would cause a higher carbon footprint for performing the workloads (e.g., workloads 112A) and processing of data (e.g., data 115A) at the data center (e.g., data center 105A) than the carbon footprint of performing the same workloads and data processing utilizing energy from the first energy provider.

In an embodiment, the global console 160 can include a carbon footprint (CF) component 173 configured to analyze the operational information 150A-n received from the various data centers 105A-n. The CF component 173 can be configured to, based upon the operational information 150A-n, in a non-limiting list, determine the carbon footprint(s) 176A-n for a respective data center 105A-n as a function of the operations being performed at a respective data center 105A-n, efficiency and usage of the respective data servers 110A-n, the energy sources being utilized by the respective energy providers 120A-n, usage history of the respective data 115A-n stored and operated on. The carbon footprint(s) 176A-n function as data providing a measure of the environmental impact data of the various operations (e.g., hosting data 115A-n, processing workloads 112A-n) performed at a respective data center (e.g., data centers 105A-n).

In an embodiment, the CF component 173 can utilize a CF computation component 175 to assist with determining the carbon footprint(s) 176A-n. The CF computation component 175 can comprise various algorithms, computational code, and the like, configured to determine a carbon footprint 176A-n from energy usage data, and the like. The energy usage of a data center 105A-n can be applied (e.g., by the CF component 173) to the computation component 175, wherein, the computation component 175 can calculate the MT $CO_2$ (carbon footprints 176A-n) associated with the energy usage, e.g., based upon generation and supply of fossil fuel-based energy to the data center, generation and supply of green energy-based energy to the data center, and the like. The computation component 175 can utilize a variety of parameters to determine the carbon footprint(s) 176A-n, wherein the parameters and their values can be sourced from government, non-profit, and private entities such as the United States Environmental Protection Agency (EPA); Canadian National Greenhouse Gas (GHG) Inventory; Sustain Energy Authority of Ireland; United Kingdom's Dept. for Environment, Food, & Rural Affairs (DEFRA); French Environment and Energy Management Agency (ADEME); Intergovernmental Panel on Climate Change (IPCC); International Energy Agency (IEA); Australia National Greenhouse Accounts (NGA) factors; the German Uweltbundesamt; and the like.

In a further embodiment, the global console 160 can be further configured to receive client information 179A-n, wherein the client information 179A-n can pertain to, in a non-limiting list, a client that already utilizes one or more data centers 105A-n as part of their digital operations, a prospective client with an interest in reducing the carbon footprint of their digital operations, and where possible, achieving a reduction in the carbon footprint, and the like. In an embodiment, the CF component 173 can review the client information 179A-n in combination with the operational information 150A-n respective to the various data centers 105A-n and the carbon footprint of performing respective digital operations thereon. In an embodiment, the CF component 173 can utilize the computation component 175 (as previously described) to assist with determining the carbon footprint(s).

In an example scenario, a client 195 provides first client information 179P detailing their potential workload(s) 112P, potential usage and storage of data 115P, etc., along with a requirement to perform their digital operations with the minimum achievable carbon footprint. Accordingly, the CF component 173 can review the operational information 150A-n pertaining to each of the data centers 105A-n and determine which of the data centers can satisfy the various requirements in the client information 179P. For example, data center 105A may have various data servers 110A/1-*n* that utilize the most recent technologies, with excellent operational efficiency, and low power consumption. Further, the data center 105A has an energy provider 120A/1 which sources a high volume (e.g., 70%) of its energy from green energy sources. In another example scenario, CF component 173 can be configured to identify one or more potential reductions in the client 195's carbon footprint(s) 176A-n as a function of moving data and workload(s) distributed across multiple low-end servers (e.g., data servers 110B/1-110B/n at data center 105B to a moderately utilized high-end server (e.g., data server 110A/2 at data center 105A), where the low-end servers and/or the high-end server can be located at the same data center or at disparate data centers.

The CF component 173 can be further configured to generate a recommendation report 182A-n detailing the review of the client information 179P in combination with the operational information 150A-n for the various data centers 105A-n. In an embodiment, the recommendation report 182A-n can be provided to the client 195 for their review. The recommendation report 182P can be provided in paper form, alternatively, the recommendation report 182P can be provided to the client 195 in electronic form, e.g., transmitted to the client 195 via the I/O component 163. Further, the I/O component 163 can be configured to receive selection information 183 from the client 195, wherein the client 195 provides information regarding the recommendation they chose to implement (e.g., the recommendation having the lowest carbon footprint(s) 176A-n) from which the respective data center(s) to be utilized to implement the recommendation to perform the workload(s), host data, etc., can be readily identified and implemented.

In a further embodiment, the global console 160 can further include an implementation component 187 configured to review the selection information 183 and based thereon, can initiate operations to, in a non-exhaustive list, migrate data, functions, etc., from one data center to another, migrate data, functions, etc., between various data servers within a data center, implement times when a data server is to be operational (e.g., during a time of demand, such as a work day) and when a data server can be put into standby mode (e.g., during a time of low demand to no demand, such as a weekend, holiday, and the like), and suchlike. In an embodiment, the implementation component 187 can operate in conjunction with the local console 130A-n to facilitate the data transfer and implementations required to satisfy the selection information 183, client information 179A-n, and a corresponding minimizing of carbon footprint(s) 176A-n.

In another embodiment, the global console 160 can further include a report component 190 configured to generate a carbon footprint (CF) report 192 detailing one or more activities enacted by the client 195 to reduce the carbon footprint(s) 176A-n of their workloads, etc. The CF report 192 can present information detailing the carbon footprint(s) 176A-n of the client 195's prior workloads (e.g., resulting from the data center and/or data servers that previously hosted the workloads, data, and the like) and the improved carbon footprint(s) 176A-n resulting from changing the client 195's workloads to a different data center, different data servers, etc. The client 195 can submit the CF report 192 to a government entity or other entity overseeing energy efficiency, as well as utilize the CF report 192 in their marketing and advertising releases, e.g., to garner public approval of the activities by the client 195 to reduce the carbon footprint(s) 176A-n arising from their digital activities.

In a further embodiment, the global console 160 can further include an artificial intelligence (AI) component 185. The AI component 185 can be configured to perform a variety of operations to enable a reduction in the carbon footprint(s) 176A-n of client 195's operations. In a first example scenario, the AI component 185 can review a variety of information, including at least any of the workload(s) 112A-n, data 115A-n, operational information 150A-n, client information 179A-n, previously generated selection information 183, a prior recommendation report 182A-n, a previously generated CF report 192, and the like, as the variety of information pertains to prior and current usage (e.g., usage history) as well as to potential future usage of data servers 110A-n. For example, the AI component 185 can be informed (e.g., in operational information 150A-n) of an upcoming replacement, change and/or upgrade to one or more data servers (e.g., any of data servers 110A-n) or other IT inventory at any of the one or more data centers (e.g., any of data centers 105A-n) and, accordingly, run performance analyses of the client information 179A-n to determine whether the anticipated future change at the one or more data centers may improve the carbon footprint(s) 176A-n of the client 195's digital operations. In another embodiment, the AI component 185 can be supplied with data (e.g., specification data) regarding data servers and IT inventory currently, or soon to be, available in the marketplace and make a determination whether procuring any of the data servers and/or IT equipment may improve the carbon footprint(s) 176A-n of one or more operations currently occurring (e.g., hosting data 115A-n, processing workload(s) 112A-n, and the like) at the one or more data centers, and based thereon, can generate an AI analysis report 186 of the potential procurements and the resulting effect thereof. In another embodiment, the AI component 185 can review the workloads 112A-n, the data 115A-n, the operational information 150A-n, client information 179A-n, and the like, to determine one or more specifications for a data server, wherein the one or more specifications can be focused on design of a data server that minimizes the carbon footprint(s) 176A-n arising from performing operations on the client 195's data 115A-n, workloads 112A-n, and the like. The operator of the data centers 105A-n can utilize the one or more specifications determined by the AI component to guide internal and/or third-party design of a data server(s) and associated IT equipment to achieve the reduced carbon footprint(s) 176A-n. In an embodiment, the analysis report can assist the operator of the data centers 105A-n with decisions regarding potential hardware and/or software upgrades, e.g., to improve the overall operational efficiency (and carbon footprint(s) 176A-n) of the data centers 105A-n, as well as to improve the operational efficiency (and carbon footprint(s) 176A-n) of hosting a client 195's data (e.g., any of data 115A-n), processing the client 195's workloads (e.g., any of workload(s) 112A-n), and the like. In an example scenario, the AI component 185 can be configured to identify one or more potential reductions in the client 195's carbon footprint(s) 176A-n as a function of moving data and workload(s) distributed across multiple servers (e.g., older generation servers, low-use servers, and the like) to a single, or lesser number of servers (e.g., a newer generation server(s), and the like) such that the single, or lesser number of servers, have a high usage and an associated improvement in operating efficiency and reduced power consumption (and reduced carbon footprint 176A-n).

In a further embodiment, the global console 160 can further include a display component 188 configured to present to an operator of the global console 160 any of, in a non-limiting list, a map indicating the respective location and operation of the data centers 105A-n; specifications, usage history, operating capacity, etc., regarding data servers 110A/1 to 110*n*/n, workloads 112A-n; data 115A-n; information regarding energy providers 120A-n; operational information 150A-n, being performed, hosted, or pertaining to any of the data centers 105A-n; instructions 170A-n, carbon footprints 176A-n, information regarding client 195, client information 179A-n, selection information 183, information presented in the CF report 192, and the like.

It is to be appreciated, that while the foregoing describes the implementation component 187 reviewing the selection information 183 prior to implementing the various actions to reduce the client 195's carbon footprint of operations, the global console 160 and the implementation component 187 can operate without having to receive authorization (e.g., included in the selection information 183) from the client 195 to proceed with reducing the client 195's carbon footprint. For example, the operator of the global console 160 and/or data centers 105A-n and the client 195 can have an agreement that the operator can implement any changes required in a continued effort to reduce the carbon footprint of the client 195's workload(s) 112A-n. Accordingly, either continuously, or at a particular period of time (e.g., weekly, monthly, half-yearly, yearly, at an IT equipment upgrade/replacement, and the like), the information component 165 can generate and send an instruction 170A-n requesting the data centers 105A-n review and forward their operational information 150A-n to the global console 160. The CF component 173 can use the received operational information 150A-n to review the operational state of the respective data centers 105A-n in conjunction with the client information 179A-n to determine whether the various workload(s) 112A-n being performed for the client 195 at the one or more data centers 105A-n should remain as currently implemented, or whether the digital operations should be, in a non-exhaustive list, transferred to one or more other data servers in the data center currently hosting the digital operations, moved to a different data center, distributed amongst two or more data centers, and suchlike. A CF report 192 can be generated at any suitable time, e.g., when the operator has changed how the workload(s) 112A-n, and supporting operations, hosted by the operator for the client 195 have changed, on a set schedule (once per month, even if no change in how the client 195's digital operations has occurred, and the like). Accordingly, the operator of the various data centers 105A-n can be continuously reviewing the client information 179A-n, the operational information 150A-n, how the client 195's data 115A-n, workloads 112A- n, and the like, are being performed and the carbon footprint 176A-n achieved therefrom. In the event that the CF component 173 determines that an improvement in the carbon footprint can be achieved by moving the client 195's data 115A-n, workloads 112A-n, etc., the operator of the global console 160 does not have to obtain authorization from the client 195 to implement the carbon footprint reducing activity.

Figure 2:
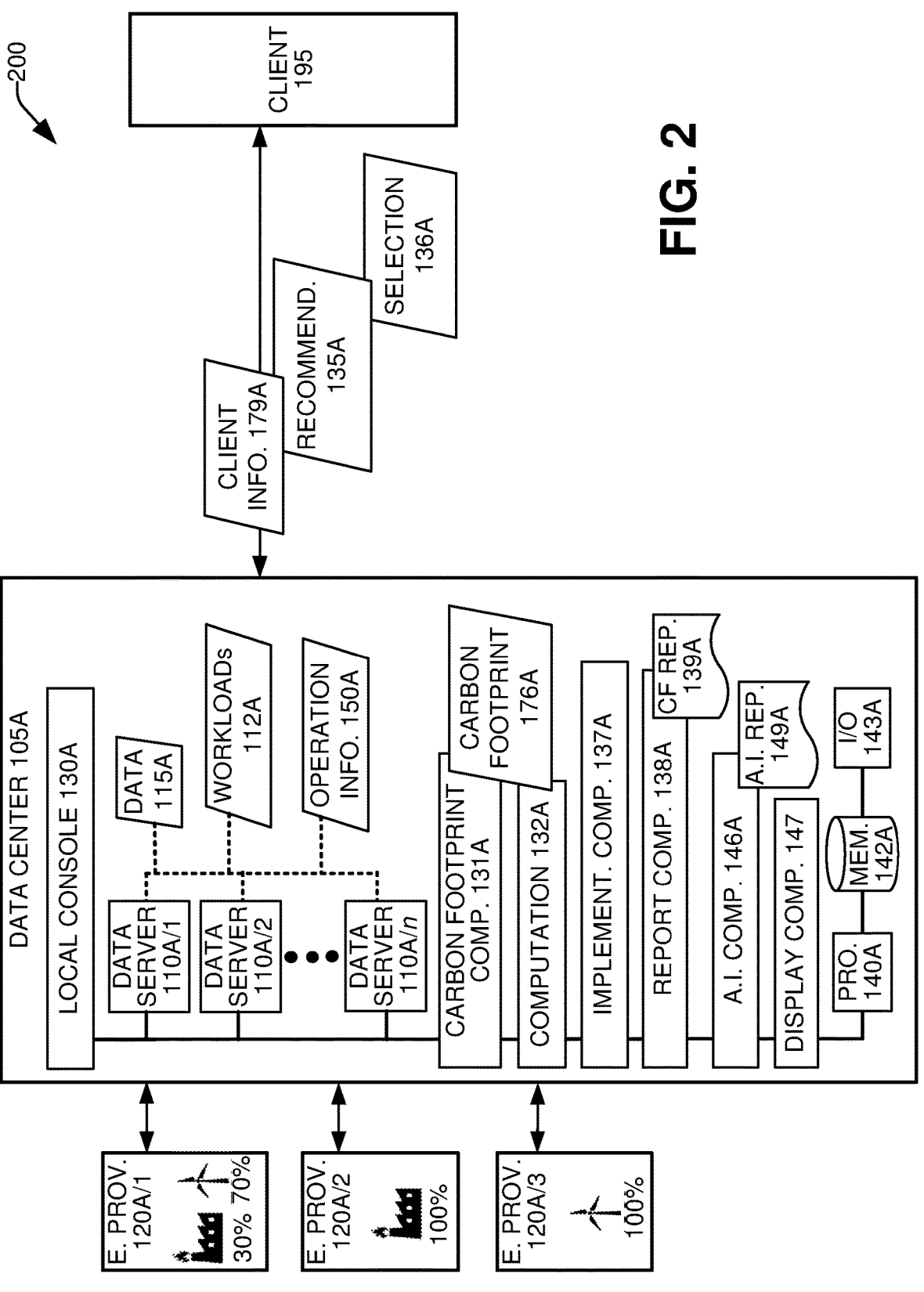
FIG. 2 is a diagram illustrating components utilized to minimize a carbon footprint of various workloads and operations performed at one or more data servers, in accordance with one or more embodiments described herein.

Turning to FIG. 2, the various embodiments can reviewed with reference to FIG. 1, whereby, while the prior discussion has largely pertained to a global console 160 interacting with a community of data centers 105A-n, the various embodiments presented herein can also be utilized by a local console (e.g., local console 130A) implemented to improve the carbon footprint of the data center (e.g., data center 105A) monitored and controlled by the local console. Per FIG. 2, the various components presented can be equally present and utilized in any of the data centers 105A-n, such that any component presented in FIG. 2 can be located at any data center, e.g., the description provide regarding local console 130A located on data center 105A can equally pertain to a local console 130B located at data center 105B, and local console 130*n* located at data center 105*n*, or carbon footprint component 131A located at data center 105A can equally pertain to carbon footprint component 131X located at data center 105X, etc. As shown in FIG. 2, in an example embodiment, a client 195 already has data 115A hosted and workloads 112A being performed at the data center 105A, however, the client 195 would like to improve the carbon footprint arising from its digital operations. In an example scenario, the data servers 110A/1-*n* located at the data center 105A can comprise a range of technologies having a range of operational efficiencies, power requirements, data capacities, etc. As previously mentioned, the data center 105A can have various energy providers 120A/1 to 120A/n available to provide power to the data center 105A.

The local console 130A can review the operational information 150A of the respective data servers 110A/1 to 110A/n with regard to operational efficiency, server utilization (e.g., how much of the server is utilized, how often is the server utilized?), etc., in accordance with the client information 179A. Based upon the review, the local console 130A can make a determination that the carbon footprint of performing the workloads 112A, hosting data 115A, and the like, would be reduced by migrating the operational code, etc., comprising workloads 112A and the data 115A from a first set of data servers (e.g., 110A/1-25) to a second set of data servers (e.g., 110A/26-28), wherein the second set of data servers are, in a non-limiting list, newer generation, higher efficiency, low power, and the like, in comparison with the first set of data servers. In an embodiment, when the workloads 112A, data 115A, and the like, has been migrated to the second set of data servers, operation of the first set of data servers can be ceased.

The data center 105A can include a CF component 131A configured to analyze the operational information 150A for data center 105A, wherein the CF component 131A can have the same functionality as the CF component 173, including determining the carbon footprint(s) 176A for the workloads 112A, data 115A, and operational information 150A. The CF component 131A can utilize a CF computation component 132A to assist with determining the carbon footprint(s) 176A, wherein the CF computation component 132A can have the same functionality as the CF computation component 175, but operates locally.

The CF component 131A can be further configured to generate a recommendation report 135A detailing the review of the client information 179A in combination with the operational information 150A, workloads 112A, and/or data 115A, etc., for the data center 105A. The recommendation report 135A can include similar recommendation information and have the same functionality (e.g., digital format/ transmission) as recommendation report 182A-n. Further, the data center 105A can be configured to receive selection information 136A from the client 195, wherein the selection information 136A can include similar information and functionality as the selection report 183, whereby, the client 195 provides information regarding the recommendation they chose to implement (e.g., the recommendation having the lowest carbon footprint(s) 176A) from which the console 130A can subsequently implement at the data center 105A.

In a further embodiment, the local console component 130A can further include an implementation component 137A configured to review the selection information 136A and implement the requested configuration(s) (e.g., implement data servers 110A/26 to 110A/28) at the data center 105A for the client 195. The implementation component 137A can have the same functionality as the implementation component 187, but operating locally on the data center 105A.

In another embodiment, the local console component 130A can further include a report component 138A configured to generate a CF report 139A detailing one or more activities enacted by the client 195 to reduce the carbon footprint(s) 176A of their workloads 112A, etc., at the data center 105A. In an example, the CF report 139A can present the carbon footprint 176A along with information regarding moving their workloads 112A and data 115A from a first set of data servers (e.g., 110A/1-25) to a second set of data servers (e.g., 110A/26-28), wherein the second set of data servers are, in a non-limiting list, newer generation, higher efficiency, low power, and the like, in comparison with the first set of data servers. The report component 138A can have the same functionality as the report component 190, and further, the CF report 139A can be utilized in the same manner as CF report 192.

In a further embodiment, the data center 105A can further include an AI component 146A, wherein the AI component 146A can be configured to provide the same functionality as the AI component 185, but with a focus on the operations, etc., conducted at the data center 105A, including generation of an analysis report 149A similar to analysis report 186.

In a further embodiment, the data center 105A can further include a display component 147 configured to present to an operator of the local console 130A any of, in a non-limiting list, a schematic indicating the respective location and operation of the data servers 110A/1 to 110A/n; specifications, usage history, operating capacity, etc., regarding data servers 110A/1 to 110A/n, workloads 112A; data 115A; information regarding energy providers 120A-1 to 120A/n; operational information 150A, being performed, hosted, or pertaining to any of the data centers 105A; instructions 170A, carbon footprints 176A, information regarding client 195, client information 179A, selection information 136A, and the like, as it pertains to data center 105A and the various embodiments presented herein.

As mentioned with regard to implementation component 187 and selection information 183, the implementation component 137A can automatically enact recommendations 135A as and when scheduled to provide ongoing reduction in the carbon footprints 176A for the various workloads 112A and data 115A for the client 195 at the data center 105A.

The data center 105A can further include a processor 140A, memory 142A, and an I/O component 143A, as previously described with reference to FIG. 1, but having a focus in FIG. 2 on operations at data center 105A.

FIG. 3 illustrates methodology 300 for minimizing a carbon footprint of various workloads and operations performed at one or more data centers, in accordance with one or more embodiments described herein.

At 310, a first option is identified (e.g., by global console 160) for hosting a client's data (e.g., data 115A-n) and/or processing the client's workloads (e.g., workloads 112A-n) at a first data center (e.g., data center 105A). In an embodiment, the client's data and/or workloads can already be located at a data center operated by the operator of the first data center.

At 320, a first carbon footprint (e.g., carbon footprints 176A-n) can be determined based on implementing the first option at the first data center. As previously described, the carbon footprint determined can be a function of, in a non-limiting list, energy source(s) (e.g., energy providers 120A-n and their fossil fuel/green energy sources) available at the first data center, IT inventory available at the first data center (e.g., operational efficiency and power consumption of data servers at the first data center, and the like), available processing capacity, and the like.

At 330, a second option is identified (e.g., by global console 160) for hosting the client's data (e.g., data 115A-n) and/or processing the client's workloads (e.g., workloads 112A-n) at a second data center (e.g., data center 105A). As previously described, the first data center and the second data center can be any of (a) respectively located at different geographic regions, (b) be powered by various energy providers, wherein the energy providers can use different sources for the energy they provide to the respective data center, and/or (c) a range of different data servers may be available at the different data centers, wherein the differences between respective servers can include power consumption, energy efficiency, operational capacity, operational efficiency, operating specification(s), and the like. In an embodiment, the client's data and/or workloads can already be located at a data center operated by the operator of the first data center and second data center, e.g., the data and/or workloads are currently located at the first data center and the comparison between the first carbon footprint and the second carbon footprint is based on the client wanting to determine whether there is a more efficient (e.g., lower carbon footprint) way to host the data and/or workloads. In another embodiment, the client's data and/or workloads can already be located at a data center operated by the operator of the first data center and second data center, however, the data and/or workloads are located at a third data center, wherein the third data center is disparate to the first data center and the second data center.

At 340, a second carbon footprint (e.g., carbon footprints 176A-n) can be determined based on implementing the second option at the second data center, wherein the second carbon footprint can be determined as previously mentioned.

At 350, the client can be presented (e.g., in recommendations 182A-n) with the first carbon footprint pertaining to implementing hosting the data (e.g., data 115A-n) and/or processing the workloads (e.g., workloads 112A-n) at the first data center.

At 360, the client can be presented (e.g., in recommendations 182A-n) with the second carbon footprint pertaining to implementing hosting the data (e.g., data 115A-n) and/or processing the workloads (e.g., workloads 112A-n) at the second data center.

At 370, an indication of whether to implement the first option or to implement the second option to host the client's data (e.g., data 115A-n) and/or process the client's workloads (e.g., workloads 112A-n) can be received from the client (e.g., in selection 183). In a first example scenario, the first option can be selected based upon the first data center is powered by a first energy provider who sources a high percentage of their energy from green energy sources, while the second data center is supplied by a second energy provider that sources minimal or zero energy from a green energy source, with the energy being sourced largely from fossil fuel sources. In another example scenario, the client is not focused on reducing the carbon footprint of their operations and prefer to utilize the second data center as it sources energy largely from fossil fuel sources. In another example scenario, the client can select the first data center as the data servers available there are of a newer/latest generation and accordingly are more energy efficient at hosting the data and/or processing the workloads in comparison with older generation data servers available at the second data center, thereby enabling fewer, higher capacity data servers to be utilized at the first data center.

At 380, the selected option, the first option or the second option, can be implemented. In an embodiment, the global console can send an instruction (e.g., instruction 170A-n) to the selected data server associated with the selected option, wherein the instruction can initiate migration of hosting the data and/or processing the workloads from a current data center to the selected first data center or the second data center.

At 390, a report (e.g., carbon footprint report 192) can be subsequently generated informing the client of the reduced carbon footprint of their activities based on migration of the data and/or processing the workloads to the data center selected at step 380. As previously mentioned, the client can submit the report to a government entity or other entity overseeing energy efficiency, as well as in their marketing and advertising releases to garner public approval of their activities.

FIG. 4 illustrates methodology 400 for minimizing a carbon footprint of various workloads and operations performed at one or more data servers, in accordance with one or more embodiments described herein. It is to be appreciated that while the presented description is directed towards components and operations pertaining to the data center 105A, the various elements can be equally applied to any data center 105A-n and components and operations pertaining thereto.

At 410, a first set of data servers can be identified (e.g., by local console 130A) for hosting a client's data (e.g., data 115A) and/or processing the client's workloads (e.g., workloads 112A) at a data center. In an embodiment, the identification can be performed by a local console (e.g., by any local console 130A located at a respective data center 105A-n) located at the data center (e.g., any of data centers 105A) at which the first set of data servers are also located.

At 420, a first carbon footprint (e.g., carbon footprints 176A-n) can be determined based on implementing the first option on the first set of data servers. As previously described, the carbon footprint determined can be a function of, in a non-limiting list, IT inventory available at the data center (e.g., operational efficiency and power consumption of data servers at the data center, and the like), available processing capacity, energy resources, and the like.

At 430, a second set of data servers are identified (e.g., by local console 130A) for hosting the client's data (e.g., data 115A) and/or processing the client's workloads (e.g., workloads 112A) at the data center (e.g., data center 105A). In an embodiment, the second set of data servers may be newer/latest generation and accordingly are more energy efficient at hosting the data and/or processing the workloads in comparison with older generation data servers included in the first set of data servers, thereby enabling migration from a large number (e.g., >10) data servers having low utilization to a small number (e.g., <10) data servers having a moderate to high utilization.

At 440, a second carbon footprint (e.g., carbon footprints 176A-n) can be determined based on utilizing the second set of data servers, wherein the second carbon footprint can be determined as previously mentioned.

At 450, the client can be presented (e.g., in recommendations 182A-n, 135A) with the first carbon footprint pertaining to utilizing the first set of data servers to host the data (e.g., data 115A) and/or process the workloads.

At 460, the client can be presented (e.g., in recommendations 182A-n, 135A) with the second carbon footprint pertaining to utilizing the second set of data servers to host the data (e.g., data 115A) and/or process the workloads.

At 470, an indication (e.g., in selection 136A) of whether to implement the first set of data servers or the second set of data servers can be received from the client (e.g., client 195).

At 480, based on the selected option, the first set of data servers can be implemented or the second set of data servers can be implemented. During implementation, the data and/or workloads can be migrated to the selected set of data servers.

At 490, a report (e.g., a carbon footprint report 139A) can be subsequently generated informing the client of the reduced carbon footprint of their activities based on migration of the data and/or processing the workloads to the first set of data servers or the second set of data servers selected at step 480. As previously mentioned, the client can submit the report to a government entity or other entity overseeing energy efficiency, as well as in their marketing and advertising releases to garner public approval of their activities.

Figure 5:
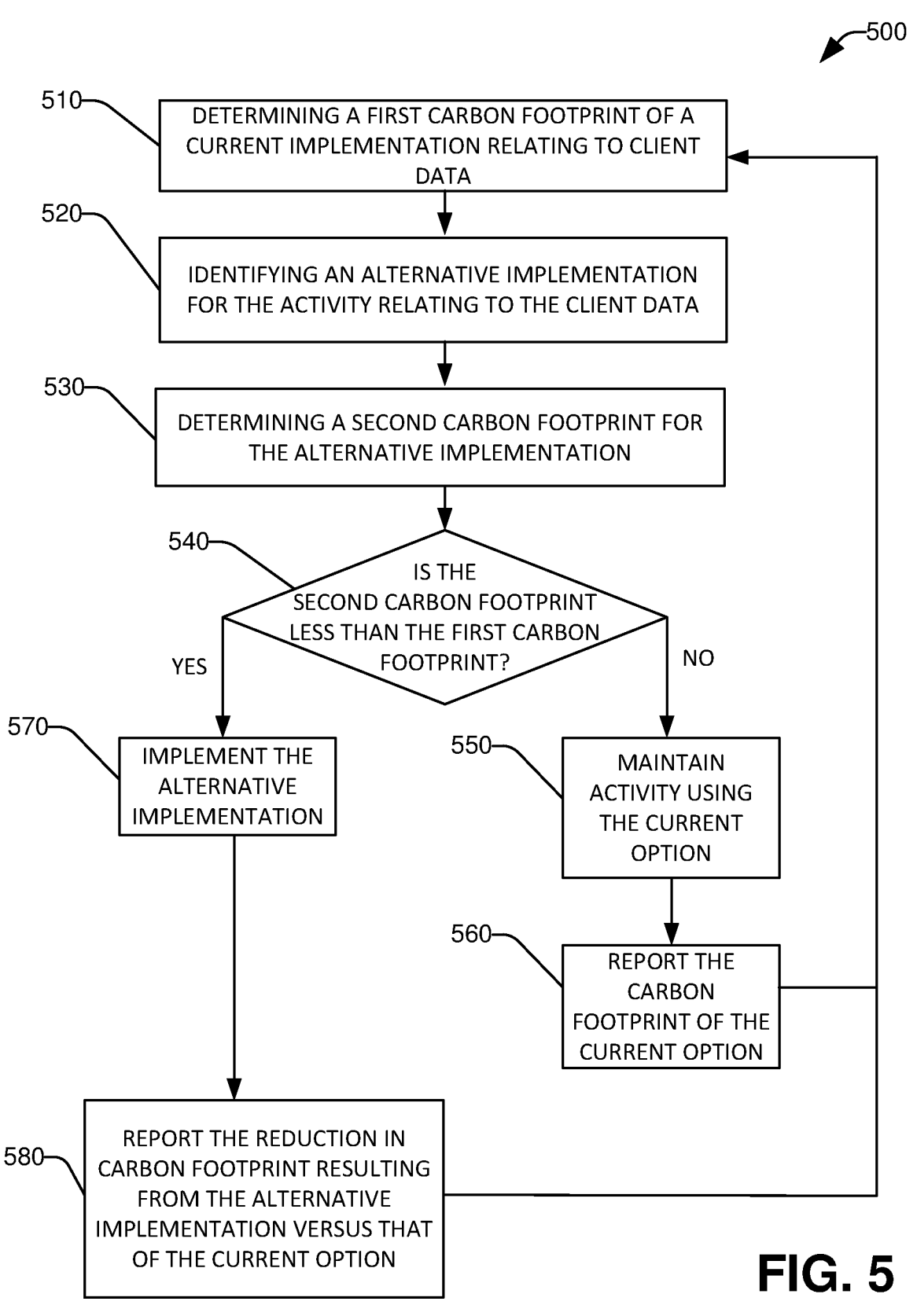
FIG. 5 is a flow diagram of a non-limiting computer implemented method for minimizing a carbon footprint of various workloads and operations performed at one or more data servers, in accordance with one or more embodiments described herein.

FIG. 5 illustrates methodology 500 for minimizing a carbon footprint of various workloads and operations performed at one or more data centers and/or data servers, in accordance with one or more embodiments described herein.

At 510, a carbon footprint (e.g., carbon footprints 176A-n) can be determined (e.g., by CF component 173, CF component 131A-n) for a current activity relating to any of hosting client data (e.g., data 115A-n) and/or performing workloads (e.g., workloads 112A-n) on the client data.

At 520, an alternative implementation for performing the workloads, etc., can be identified. As previously described, the option can be any of utilizing different data servers than currently being utilized, as well as different energy sources (e.g., sources utilizing a higher ratio of green energy sources versus fossil fuel sources), switching servers off and on based upon operational workload (e.g., weekday demand versus weekend demand). Further, an AI component (e.g., AI component 185, 146A-n) can be utilized to review specifications and usage of currently used data servers versus data servers currently being released, or soon to be released, to market. The AI component can further review the current usage history of the data servers hosting the workloads and identify an improved method (e.g., lower carbon footprint) to host the workloads with no sacrifice in workload operations. As previously described, the AI component can be utilized to assist in development of data server technology to enable improved operation of the workloads, e.g., with regard to reducing the carbon footprint.

At 530, the carbon footprint (e.g., carbon footprints 176A-n) of the alternative implementation can be determined (e.g., by CF component 173, 131A-n).

At 540, a determination can be made as to whether the second carbon footprint has a value less than the first carbon footprint, e.g., does the alternative implementation improve the carbon footprint with regard to the current footprint?

At 550, in response to a determination that NO, the calculated second carbon footprint does not improve on the first carbon footprint determined for the current activity, the console (e.g., global console 160, local console 130A-n) can maintain operations as they are currently implemented.

At 560, the first carbon footprint of the current implementation can be reported (e.g., in CF report 192, 139A-F) in conjunction with the second carbon footprint determined for the inferior alternative implementation. The methodology 500 can return to 510 for a future determination to be made.

At 570, in response to a determination that YES, the second carbon footprint is superior to the first carbon footprint, the alternative implementation can be employed (e.g., global console 160, local console 130A-n).

At 580, the second carbon footprint of the alternative implementation can be reported (e.g., in CF report 192, 139A-F) in conjunction with the first carbon footprint of the inferior current implementation. The methodology 500 can return to 510 for a future determination to be made, wherein the alternative implementation is now the current implementation.

FIG. 6 illustrates methodology 600 for minimizing a carbon footprint of various workloads and operations performed at one or more data centers and/or data servers, in accordance with one or more embodiments described herein.

At 610, the first operational effect of utilizing a first option for reducing the carbon footprint of a client's digital activities (e.g., resulting from storing data 115A-n and/or performing workloads 112A-n) at a first data center (e.g., data center 105X) is determined (e.g., by CF component 173). In an example scenario, the first data center (e.g., in Europe) is located remotely, e.g., on a different continent, from the client's head office/business operations center (e.g., in the U.S.A.). Energy for the first data center is sourced by a first energy provider using energy 100% generated by green energy sources, with an according first carbon footprint (e.g., carbon footprints 176A-n) having a low value.

At 620, the second operational effect of utilizing a second option for reducing the carbon footprint of the client's digital activities is determined (e.g., by CF component 173). Continuing the example scenario, the second option entails utilizing a second data center (e.g., data center 105Y) located on the same continent (e.g., U.S.A.) as the continent (e.g., U.S.A.) as the client's business operations center. The second data center is powered by an energy provider sourcing energy from 50% fossil fuel and 50% green energy, wherein the second carbon footprint (e.g., carbon footprints 176A-n) has a higher value than the first carbon footprint, e.g., the second carbon footprint is inferior to the first carbon footprint. The first and second operational effect can relate to the time it takes for instructions/operations to be initiated by the client's business operations and subsequently performed at the data center, including the transmission time between the client's business center to the data center and return, also known as the "lag time".

At 630, a determination (e.g., by CF component 173) can be made regarding whether the first operational effect is acceptable in view of the first carbon footprint or the second operational effect is acceptable in view of the second carbon footprint. Continuing the example, the client's operations can involve database analysis from which reports are generated, which is not a time critical activity. Alternatively, the client's operations can involve time critical processing. Accordingly, even though the first carbon footprint is low, the lag time may be unacceptable to the core business of the client (e.g., time critical processing) and the client has to accept a higher carbon footprint accompanying the lower lag time. Alternatively, where the operations are not time sensitive, the client can take advantage of the It is to be appreciated that while FIG. 6 relates to an operational effect of "lag time", the methodology can relate to any operational effect pertaining to performing digital operations at a first data center and a second data center.

At 640, in response to a determination that YES the first operational effect (e.g., long lag time) is acceptable, the first data center can be utilized and advantage taken of the low carbon footprint.

At 650, the first carbon footprint of the first data center can be reported (e.g., in CF report 192). The method can return to 610 for a future determination to be made.

At 640, in response to a determination that NO the first operational effect (e.g., long lag time) is not acceptable, the second data center can be utilized with the short lag time even though the second carbon footprint is higher than the first carbon footprint. Methodology 600 can advance to 650, wherein the second carbon footprint of the second data center can be reported (e.g., in CF report 192) accompanied by the reason for the operational selection of the second data center. The methodology 600 can return to 610 for a future determination to be made.

Example Applications and Use

Figure 7:
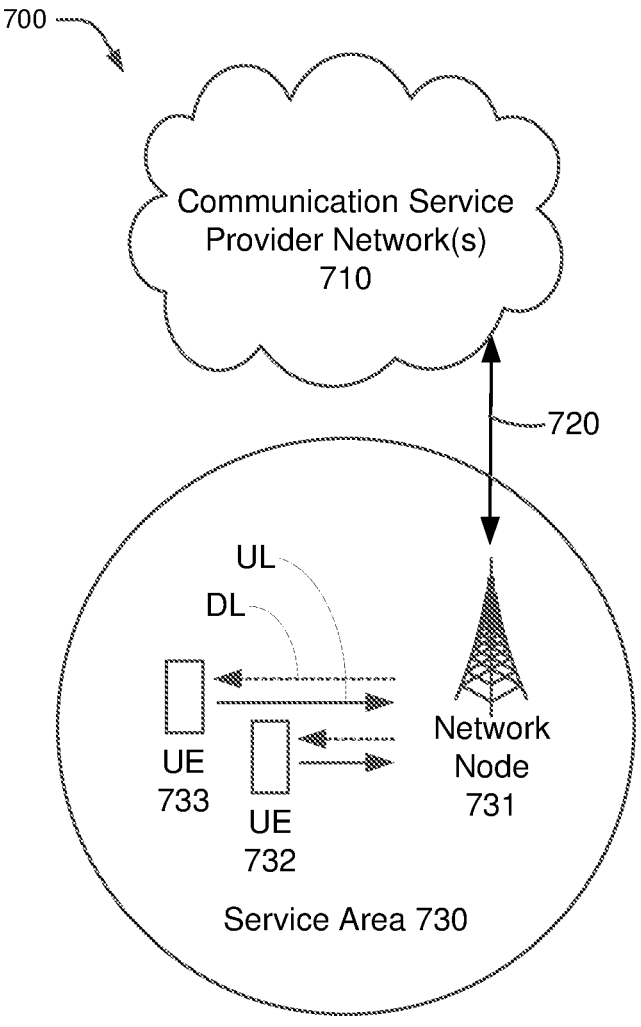
FIG. 7 illustrates an example wireless communication system, in accordance with one or more embodiments described herein.

FIG. 7 illustrates an example wireless communication system 700, in accordance with one or more embodiments described herein. The example wireless communication system 700 comprises communication service provider network(s) 710, a network node 731, and user equipment (UEs) 732, 733. A backhaul link 720 connects the communication service provider network(s) 710 and the network node 731. The network node 731 can communicate with UEs 732, 733 within its service area 730. The dashed arrow lines from the network node 731 to the UEs 732, 733 represent downlink (DL) communications to the UEs 732, 733. The solid arrow lines from the UEs 732, 733 to the network node 731 represent uplink (UL) communications.

In general, with reference to FIG. 7, the non-limiting term "user equipment" can refer to any type of device that can communicate with network node 731 in a cellular or mobile communication system 700. UEs 732, 733 can have one or more antenna panels having vertical and horizontal elements. Examples of UEs 732, 733 comprise target devices, device to device (D2D) UEs, machine type UEs or UEs capable of machine to machine (M2M) communications, personal digital assistants (PDAs), tablets, mobile terminals, smart phones, laptop mounted equipment (LME), universal serial bus (USB) dongles enabled for mobile communications, computers having mobile capabilities, mobile devices such as cellular phones, laptops having laptop embedded equipment (LEE, such as a mobile broadband adapter), tablet computers having mobile broadband adapters, wearable devices, virtual reality (VR) devices, heads-up display (HUD) devices, smart cars, machine-type communication (MTC) devices, augmented reality head mounted displays, and the like. UEs 732, 733 can also comprise IOT devices that communicate wirelessly.

In various embodiments, system 700 comprises communication service provider network(s) 710 serviced by one or more wireless communication network providers. Communication service provider network(s) 710 can comprise a "core network". In example embodiments, UEs 732, 733 can be communicatively coupled to the communication service provider network(s) 710 via a network node 731. The network node 731 can communicate with UEs 732, 733, thus providing connectivity between the UEs 732, 733 and the wider cellular network. The UEs 732, 733 can send transmission type recommendation data to the network node 731. The transmission type recommendation data can comprise a recommendation to transmit data via a closed loop multiple input multiple output (MIMO) mode and/or a rank-1 precoder mode.

Network node 731 can have a cabinet and other protected enclosures, computing devices, an antenna mast, and multiple antennas for performing various transmission operations (e.g., MIMO operations) and for directing/steering signal beams. Network node 731 can comprise one or more base station devices which implement features of the network node. Network nodes can serve several cells, depending on the configuration and type of antenna. In example embodiments, UEs 732, 733 can send and/or receive communication data via wireless links to the network node 731.

Communication service provider networks 710 can facilitate providing wireless communication services to UEs 732, 733 via the network node 731 and/or various additional network devices (not shown) included in the one or more communication service provider networks 710. The one or more communication service provider networks 710 can comprise various types of disparate networks, including but not limited to: cellular networks, femto networks, picocell networks, microcell networks, internet protocol (IP) networks Wi-Fi service networks, broadband service network, enterprise networks, cloud-based networks, millimeter wave networks and the like. For example, in at least one implementation, system 700 can be or comprise a large-scale wireless communication network that spans various geographic areas. According to this implementation, the one or more communication service provider networks 710 can be or comprise the wireless communication network and/or various additional devices and components of the wireless communication network (e.g., additional network devices and cell, additional UEs, network server devices, etc.).

The network node 731 can be connected to the one or more communication service provider networks 710 via one or more backhaul links 720. The one or more backhaul links 720 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 720 can also comprise wireless link components, such as but not limited to, line-of-sight (LOS) or non-LOS links which can comprise terrestrial air-interfaces or deep space links (e.g., satellite communication links for navigation). Backhaul links 720 can be implemented via a "transport network" in some embodiments. In another embodiment, network node 731 can be part of an integrated access and backhaul network. This may allow easier deployment of a dense network of self-backhauled 5G cells in a more integrated manner by building upon many of the control and data channels/procedures defined for providing access to UEs 732, 733.

Wireless communication system 700 can employ various cellular systems, technologies, and modulation modes to facilitate wireless radio communications between devices (e.g., the UEs 732, 733 and the network node 731). While example embodiments might be described for 5G new radio (NR) systems, the embodiments can be applicable to any radio access technology (RAT) or multi-RAT system where the UE operates using multiple carriers, e.g., LTE FDD/TDD, GSM/GERAN, CDMA2000 etc.

For example, system 700 can operate in accordance with any 5G, next generation communication technology, or existing communication technologies, various examples of which are listed supra. In this regard, various features and functionalities of system 700 are applicable where the devices (e.g., the UEs 732, 733 and the network node 731) of system 700 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 700 can be configured to provide and employ 5G or subsequent generation wireless networking features and functionalities. 5G wireless communication networks are expected to fulfill the demand of exponentially increasing data traffic and to allow people and machines to enjoy gigabit data rates with virtually zero (e.g., single digit millisecond) latency. Compared to 4G, 5G supports more diverse traffic scenarios. For example, in addition to the various types of data communication between conventional UEs (e.g., phones, smartphones, tablets, PCs, televisions, internet enabled televisions, AR/VR head mounted displays (HMDs), etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example, several hundreds of thousands of simultaneous connections to be supported for massive sensor deployments; improved coverage, enhanced signaling efficiency; reduced latency compared to LTE.

The 5G access network can utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 9 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the 3GPP and has been in use (including with LTE), is a multi-antenna technique that can improve the spectral efficiency of transmissions, thereby significantly boosting the overall data carrying capacity of wireless systems. The use of MIMO techniques can improve mmWave communications and has been widely recognized as a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are in use in 5G systems.

In order to provide additional context for various embodiments described herein, FIG. 7 and the following discussion are intended to provide a brief, general description of a suitable computing environment 700 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Figure 8:
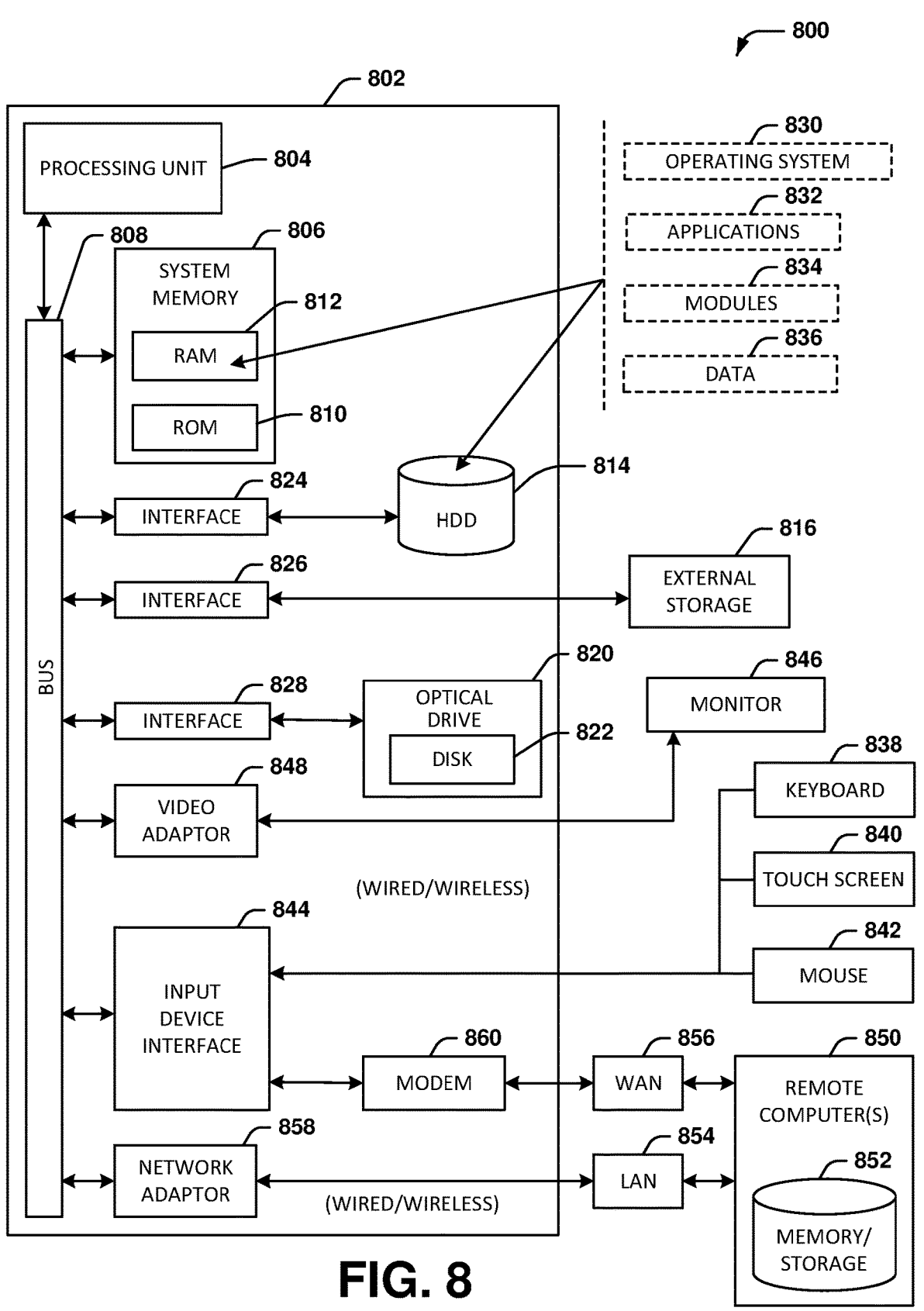
FIG. 8 illustrates a block diagram of an example computer operable to execute one or more embodiments presented herein.

With reference again to FIG. 8, the example environment 800 for implementing various embodiments of the aspects described herein includes a computer 802, the computer 802 including a processing unit 804, a system memory 806 and a system bus 808. The system bus 808 couples system components including, but not limited to, the system memory 806 to the processing unit 804. The processing unit 804 can be any of various commercially available processors and may include a cache memory. Dual microprocessors and other multi-processor architectures can also be employed as the processing unit 804.

The system bus 808 can be any of several types of bus structure that can further interconnect to a memory bus (with or without a memory controller), a peripheral bus, and a local bus using any of a variety of commercially available bus architectures. The system memory 806 includes ROM 810 and RAM 812. A basic input/output system (BIOS) can be stored in a non-volatile memory such as ROM, erasable programmable read only memory (EPROM), EEPROM, which BIOS contains the basic routines that help to transfer information between elements within the computer 802, such as during startup. The RAM 812 can also include a high-speed RAM such as static RAM for caching data.

The computer 802 further includes an internal hard disk drive (HDD) 814 (e.g., EIDE, SATA), one or more external storage devices 816 (e.g., a magnetic floppy disk drive (FDD) 816, a memory stick or flash drive reader, a memory card reader, etc.) and an optical disk drive 820 (e.g., which can read or write from a CD-ROM disc, a DVD, a BD, etc.). While the internal HDD 814 is illustrated as located within the computer 802, the internal HDD 814 can also be configured for external use in a suitable chassis (not shown). Additionally, while not shown in environment 800, a solid-state drive (SSD) could be used in addition to, or in place of, an HDD 814. The HDD 814, external storage device(s) 816 and optical disk drive 820 can be connected to the system bus 808 by an HDD interface 824, an external storage interface 826 and an optical drive interface 828, respectively. The interface 824 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 802, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 812, including an operating system 830, one or more application programs 832, other program modules 834 and program data 836. All or portions of the operating system, applications, modules, and/or data can also be cached in the RAM 812. The systems and methods described herein can be implemented utilizing various commercially available operating systems or combinations of operating systems.

Computer 802 can optionally comprise emulation technologies. For example, a hypervisor (not shown) or other intermediary can emulate a hardware environment for operating system 830, and the emulated hardware can optionally be different from the hardware illustrated in FIG. 8. In such an embodiment, operating system 830 can comprise one virtual machine (VM) of multiple VMs hosted at computer 802. Furthermore, operating system 830 can provide runtime environments, such as the Java runtime environment or the .NET framework, for applications 832. Runtime environments are consistent execution environments that allow applications 832 to run on any operating system that includes the runtime environment. Similarly, operating system 830 can support containers, and applications 832 can be in the form of containers, which are lightweight, standalone, executable packages of software that include, e.g., code, runtime, system tools, system libraries and settings for an application.

Further, computer 802 can comprise a security module, such as a trusted processing module (TPM). For instance with a TPM, boot components hash next in time boot components, and wait for a match of results to secured values, before loading a next boot component. This process can take place at any layer in the code execution stack of computer 802, e.g., applied at the application execution level or at the operating system (OS) kernel level, thereby enabling security at any level of code execution.

A user can enter commands and information into the computer 802 through one or more wired/wireless input devices, e.g., a keyboard 838, a touch screen 840, and a pointing device, such as a mouse 842. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 804 through an input device interface 844 that can be coupled to the system bus 808, but can be connected by other interfaces, such as a parallel port, an IEEE 1394 serial port, a game port, a USB port, an IR interface, a BLUETOOTH® interface, etc.

A monitor 846 or other type of display device can be also connected to the system bus 808 via an interface, such as a video adapter 848. In addition to the monitor 846, a computer typically includes other peripheral output devices (not shown), such as speakers, printers, etc.

The computer 802 can operate in a networked environment using logical connections via wired and/or wireless communications to one or more remote computers, such as a remote computer(s) 850. The remote computer(s) 850 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 852 is illustrated. The logical connections depicted include wired/wireless connectivity to a local area network (LAN) 854 and/or larger networks, e.g., a wide area network (WAN) 856. Such LAN and WAN networking environments are commonplace in offices and companies, and facilitate enterprise-wide computer networks, such as intranets, all of which can connect to a global communications network, e.g., the internet.

When used in a LAN networking environment, the computer 802 can be connected to the local network 854 through a wired and/or wireless communication network interface or adapter 858. The adapter 858 can facilitate wired or wireless communication to the LAN 854, which can also include a wireless access point (AP) disposed thereon for communicating with the adapter 858 in a wireless mode.

When used in a WAN networking environment, the computer 802 can include a modem 860 or can be connected to a communications server on the WAN 856 via other means for establishing communications over the WAN 856, such as by way of the internet. The modem 860, which can be internal or external and a wired or wireless device, can be connected to the system bus 808 via the input device interface 844. In a networked environment, program modules depicted relative to the computer 802 or portions thereof, can be stored in the remote memory/storage device 852. It will be appreciated that the network connections shown are example and other means of establishing a communications link between the computers can be used.

When used in either a LAN or WAN networking environment, the computer 802 can access cloud storage systems or other network-based storage systems in addition to, or in place of, external storage devices 816 as described above. Generally, a connection between the computer 802 and a cloud storage system can be established over a LAN 854 or WAN 856 e.g., by the adapter 858 or modem 860, respectively. Upon connecting the computer 802 to an associated cloud storage system, the external storage interface 826 can, with the aid of the adapter 858 and/or modem 860, manage storage provided by the cloud storage system as it would other types of external storage. For instance, the external storage interface 826 can be configured to provide access to cloud storage sources as if those sources were physically connected to the computer 802.

The computer 802 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," "BS transceiver," "BS device," "cell site," "cell site device," "gNode B (gNB)," "evolved Node B (eNode B, eNB)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "client 195 entity," "consumer," "client 195 entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

It should be noted that although various aspects and embodiments are described herein in the context of 5G or other next generation networks, the disclosed aspects are not limited to a 5G implementation, and can be applied in other network next generation implementations, such as sixth generation (6G), or other wireless systems. In this regard, aspects or features of the disclosed embodiments can be exploited in substantially any wireless communication technology. Such wireless communication technologies can include universal mobile telecommunications system (UMTS), global system for mobile communication (GSM), code division multiple access (CDMA), wideband CDMA (WCMDA), CDMA2000, time division multiple access (TDMA), frequency division multiple access (FDMA), multi-carrier CDMA (MC-CDMA), single-carrier CDMA (SC-CDMA), single-carrier FDMA (SC-FDMA), orthogonal frequency division multiplexing (OFDM), discrete Fourier transform spread OFDM (DFT-spread OFDM), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM (CP-OFDM), resource-block-filtered OFDM, wireless fidelity (Wi-Fi), worldwide interoperability for microwave access (WiMAX), wireless local area network (WLAN), general packet radio service (GPRS), enhanced GPRS, third generation partnership project (3GPP), long term evolution (LTE), 5G, third generation partnership project 2 (3GPP2), ultra-mobile broadband (UMB), high speed packet access (HSPA), evolved high speed packet access (HSPA+), high-speed downlink packet access (HSDPA), high-speed uplink packet access (HSUPA), Zigbee, or another institute of electrical and electronics engineers (IEEE) 802.12 technology.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A first computing system, comprising:
at least one processor; and
at least one memory that stores executable instructions that, when executed by the at least one processor, facilitate performance of operations, comprising:
  receiving, by the first computing system:
    from first equipment associated with a first energy provider, first environmental impact digital data representative of a first environmental impact associated with a first option available to perform a computing operation with respect to client data at a second computing system, wherein the first option is representative of the first equipment associated with the first energy provider being configured to power the second computing system, wherein first energy provided by the first equipment associated with the first energy provider comprises a first portion of energy comprising a first ratio of green energy with respect to fossil-fuel derived energy, and wherein a first percentage of green energy represented by the first ratio is a first non-zero amount, and from second equipment associated with a second energy provider, second environmental impact digital data representative of a second environmental impact associated with a second option available to perform a computing operation with respect to the client data, wherein the second option is representative of the second equipment associated with the second energy provider being configured to power the second computing system, wherein second energy provided by the second equipment associated with the second energy provider comprises a second portion of energy comprising a second ratio of green energy with respect to fossil-fuel derived energy, wherein a second percentage of green energy represented by the second ratio is a second non-zero amount, and wherein the first ratio and second ratio are different;

comparing the first environmental impact digital data with the second environmental impact digital data;

based on a result of the comparing indicating that the first option has a lower carbon footprint than the second option, generating an instruction to implement the first option to power the second computing system and to further adjust operation of at least one server located at the second computing system to operate in accordance with power available with implementing the first option; and transmitting the instruction to the second computing system, as a result of which:

at least some of the first energy is provided by the first equipment associated with the first energy provider for consumption at the second computing system, and the second computing system operates with a lower carbon footprint than achievable with the second energy provided by the second energy provider at the second computing system without the at least some of the first energy.

2. The system of claim 1, wherein the first environmental impact digital data is an energy cost of a first equipment available at the second computing system to perform at least one of store the client data or execute a workload utilizing the client data, and the second environmental impact digital data is an energy cost of the second computing system to perform at least one of store the client data or execute the workload utilizing the client data.

3. The system of claim 1, wherein the first environmental impact digital data is a carbon footprint from implementation of the first option and the second environmental impact digital data is a carbon footprint from implementation of the second option.

4. The system of claim 1, wherein the operations further comprise presenting a report detailing a first carbon footprint resulting from the selection of the first option to perform at least one of store the client data or execute a workload utilizing the client data and a second carbon footprint resulting from second option to perform at least one of store the client data or execute a workload utilizing the client data.

5. The system of claim 2, wherein the operations further comprise:

generating a usage history of the client data; and based on a usage history of the client data, predicting a future use of the client data to facilitate a future selection of the first option to store the client data or the second option to store the client data.

6. The system of claim 1, wherein the system is a cloud-based analytics console.

7. A method, comprising:

receiving, by a device comprising at least one processor located at a first computing system:

from first equipment associated with a first energy provider, first environmental impact digital data of a first option available to process a client data workload at a second computing system, wherein the first option is representative of the first equipment associated with the first energy provider being configured to power the second computing system, wherein first energy provided by the first equipment associated with the first energy provider comprises a first ratio of green energy and fossil-fuel derived energy, wherein a first percentage of green energy represented by the first ratio is a first non-zero amount, and wherein the client data has a digital format, and from second equipment associated with a second energy provider, second environmental impact digital data of a second option available to process the client data workload at the second computing system, wherein the second option is representative of the second equipment associated with the second energy provider being configured to power the second computing system, wherein second energy provided by the second equipment associated with the second energy provider comprises a second ratio of green energy and fossil-fuel derived energy, wherein a second percentage of green energy in the second ratio is a second non-zero amount, and wherein the first energy provider and the second energy provider are disparate;

in response to the receiving, comparing, by the first computing system, the first environmental impact digital data and the second environmental impact digital data with a defined energy requirement; and in response to determining that the first environmental impact digital data has a lower carbon footprint than the second environmental impact digital data and satisfies the defined energy requirement, instructing the second computing system to utilize the first energy provider to provision at least some of the first energy to power the second computing system to facilitate operation of the second computing system in accordance with the defined energy requirement, or in response to determining that the second environmental impact digital data has a lower carbon footprint than the first environmental impact digital data and satisfies the defined energy requirement, instructing the second computing system to utilize the second energy provider to provision at least some of the second energy, without provisioning the at least some of the first energy, to power the second computing system to facilitate operation of the second computing system in accordance with the defined energy requirement, and wherein the instruction further comprises adjust operation of at least one server located at the second computing system to operate in accordance with power available when utilizing the second energy provider to provision at least some of the second energy to power the second computing system.

8. The method of claim 7, further comprising generating a report detailing a reduction in carbon footprint generated by utilizing the first option instead of the second option.

9. A non-transitory machine-readable medium, comprising executable instructions that, when executed by at least one processor located at a first computing system, facilitate performance of operations, the operations comprising:

receiving first energy data from first equipment associated with a first energy provider configured to power a second computing system, wherein the first energy data comprises a first ratio of green energy to fossil-fuel derived energy or of fossil-fuel derived energy to green energy, and wherein a first percentage of green energy in the first ratio is a first non-zero amount;

determining, from the first energy data, first environmental impact data representative of a first impact from utilizing first energy from the first energy provider to process a client data workload at the second computing system, wherein the client data is digital data;

receiving second energy data from second equipment associated with a second energy provider configured to power the second computing system, wherein the second energy data comprises a second ratio of green energy to fossil-fuel derived energy or of fossil-fuel derived energy to green energy, and wherein a second percentage of green energy in the second ratio is a second non-zero amount;

determining, from the second energy data, second environmental impact data representative of a second impact from utilizing second energy from the second energy provider to process the client data workload at the second computing system;

comparing the first environmental impact data and the second environmental impact data with a defined energy requirement;

in response to determining that the first environmental impact data has a lower carbon footprint than the second environmental impact data and satisfies the defined energy requirement, instructing the second computing equipment to utilize the first energy provider to provision energy to power the second computing system to facilitate operation of the second computing system in accordance with the defined energy requirement, or in response to determining that the second environmental impact data has a lower carbon footprint than the second environmental impact data and satisfies the defined energy requirement, instructing the second computing equipment to utilize the second energy provider to provision energy to power the second computing system to facilitate operation of the second computing system in accordance with the defined energy requirement; and further instructing at least one server operating at the second computing equipment to adjust operation of the at least one server to operate in accordance with energy available when utilizing the second energy provider to provision at least some of the energy to power the second computing equipment.

10. The non-transitory machine-readable medium of claim 9, the operations further comprising generating and presenting a report detailing a reduction in an environmental impact of processing the client data workload based on selection of the first option or the second option.

11. The non-transitory machine-readable medium of claim 9, wherein the first environmental impact data is a first carbon footprint generated by first equipment available to process the client data workload, and the second environmental impact data is a second carbon footprint generated by second equipment available to process the client data workload.

12. The system of claim 1, wherein the computing operation is at least one of storing the client data on a server device located at the second computing system or executing a workload utilizing the client data on the server device located at the second computing system.

13. The system of claim 1, wherein the operations further comprise:

outputting the first environmental impact digital data and the second environmental impact digital data via a user interface of the second computing system; and receiving an input via the user interface, wherein the input is one of an indication of a first selection of the first option, causing the first option to be implemented to perform the computing operation with respect to the data, or based on the input data comprising the indication of a second selection of the second option, causing the second option to be implemented to perform the computing operation with respect to data.

14. The method of claim 7, wherein the first computing system is a cloud-based analytics console.

15. The method of claim 7, wherein processing of the client data workload is at least one of storing the client data on a server device located at the second computing system or executing a workload utilizing the client data on the server device located at the second computing system.

16. The method of claim 7, wherein the operations further comprise:

generating a usage history of the client data; and based on a usage history of the client data, predicting a future use of the client data to facilitate a future selection of the first option to store the client data or the second option to store the client data.

17. The method of claim 7, wherein the energy requirement is defined by one of a government entity, a non-profit entity, or a private entity.

18. The non-transitory machine-readable medium of claim 9, wherein processing of the client data workload is at least one of storing the client data on a server device located at the second computing system or executing a workload utilizing the client data on the server device located at the second computing system.

19. The non-transitory machine-readable medium of claim 9, wherein the operations further comprising:

generating a usage history of the client data; and based on a usage history of the client data, predicting a future use of the client data to facilitate a future selection of the first option to store the client data or the second option to store the client data.

20. The non-transitory machine-readable medium of claim 9, wherein the energy requirement is defined by one of a government entity, a non-profit entity, or a private entity.

* * * * *